(12) United States Patent
Markstaler

(10) Patent No.: US 7,821,210 B2
(45) Date of Patent: Oct. 26, 2010

(54) CONTROL SYSTEM FOR A PLURALITY OF LAMP-OPERATING DEVICES THAT ARE ARRANGED IN A DISTRIBUTED MANNER AND METHOD FOR INITIALIZING SUCH A CONTROL SYSTEM

(75) Inventor: Markus Markstaler, Hohenems (AT)

(73) Assignee: Zumtobel Lighting GmbH, Dornbirn (AT)

( * ) Notice: Subject to any disclaimer, the term of this patent is extended or adjusted under 35 U.S.C. 154(b) by 949 days.

(21) Appl. No.: 10/572,848

(22) PCT Filed: Sep. 24, 2004

(86) PCT No.: PCT/EP2004/010753

§ 371 (c)(1),
(2), (4) Date: Dec. 22, 2006

(87) PCT Pub. No.: WO2005/032218

PCT Pub. Date: Apr. 7, 2005

(65) Prior Publication Data

US 2007/0080820 A1      Apr. 12, 2007

(30) Foreign Application Priority Data

Sep. 25, 2003   (DE) ............................... 103 44 619

(51) Int. Cl.
*H05B 37/02* (2006.01)
(52) U.S. Cl. ..................... 315/291; 315/88; 315/307
(58) Field of Classification Search .................. 315/291, 315/307, 308, 88, 89, 90, 91, 92, 93
See application file for complete search history.

(56) References Cited

U.S. PATENT DOCUMENTS 7,009,348 B2 *   3/2006   Mogilner et al. ............ 315/307

FOREIGN PATENT DOCUMENTS

| EP | 433527 A1 | 6/1991 |
|---|---|---|
| EP | 940904 A2 | 9/1999 |

* cited by examiner

*Primary Examiner*—David Hung Vu
(74) *Attorney, Agent, or Firm*—Fitzpatrick, Cella, Harper & Scinto

(57) ABSTRACT

Disclosed is a control system for several distributed lamp-operating devices, comprising at least one control station (1), a control line (2) that connects the control station (1) to each lamp-operating device, and a receiver which is allocated to each lamp-operating device and is used for communicating with the control station (1). Each lamp-operating device in said control system is part of a first or a second type while lamp-operating devices of the first and the second type can be combined into functional couples. The lamp-operating devices of the first type (20-1, 20-2) are configured and connected to the respectively allocated lamp-operating device of the second type (10-1 to 10-4) so as to be able to selectively activate or deactivate the lamp-operating devices of the second type (10-1 to 10-4) in accordance with a request by the control station (1).

19 Claims, 4 Drawing Sheets

CONTROL SYSTEM FOR A PLURALITY OF LAMP-OPERATING DEVICES THAT ARE ARRANGED IN A DISTRIBUTED MANNER AND METHOD FOR INITIALIZING SUCH A CONTROL SYSTEM

This application is a national stage application under 35 U.S.C. §371 of International application No. PCT/EP2004/010753, filed Sep. 24, 2004, which claims the benefit of German Application No. 103 44 619.2, filed Sep. 25, 2003, the priorities of both of which are hereby claimed. The International Application is incorporated by reference herein in its entirety, and was published in German as International Publication No. WO 2005/032218 on Apr. 7, 2005.

The present invention relates to a control system for a plurality of lamp-operating devices that are arranged in a distributed manner and each of which belong to a first or a second type and also to a method for initializing such a control system.

In lighting systems for comparatively large buildings or installations it is necessary not only to be able to switch on or off or adjust the brightness of light sources that are located in different areas by way of the switches or dimmers that are arranged in the respective areas, but also in addition for there to be the possibility of controlling the light sources remotely from a central position. Modern lighting systems therefore have one or more control stations which are able to address and control by way of commands the lamp-operating devices that are arranged non-centrally in different areas and are connected to a common current supply network. In this way, central monitoring and control of all the light sources is rendered possible.

The activation of individual lamp-operating devices is effected by way of an address that is individually allocated to them and by way of which they can be addressed by the central control unit. In this connection, so-called operating addresses, which take into consideration the arrangement of the light sources in the different areas, are preferably assigned to the lamp-operating devices. As a result, the possibility exists of also additionally combining the light sources, which are arranged in various areas, into groups that can be addressed jointly by the central control unit. The allocation of the operating addresses is then effected during the start-up of the system when it is established which lamp-operating device is located at which location and the operating addresses can then be given out accordingly. A corresponding method for this is known, for example, from EP 0 433 527 A1.

In order to be able to satisfy the relevant safety regulations, complex lighting systems also always have so-called safety lights which guarantee basic lighting in the case of any emergency that occurs. For this, special emergency light lamp-operating devices are provided that have their own extra-low voltage accumulator that is charged during the normal operation of the lighting system by way of the general current supply. The emergency light lamp-operating devices are able to identify a failure of the normal system voltage and thereupon automatically initiate an emergency operation in which the associated lamp is operated in a given emergency with use of the energy that has been stored in the accumulator.

A classic emergency light lamp-operating device is merely provided to activate the associated lamp as well in fact just during an emergency operation. If the lamp is to be additionally used as well during the normal operation of the lighting system, in principle an extension of the emergency light lamp-operating device would by all means be conceivable. However, in the main it is provided that a particular lamp-operating device be provided therefor. This normal lamp-operating device then together with the emergency light lamp-operating device forms a functional couple that is connected to a single lamp, with the normal lamp-operating device activating the lamp during the normal operation and the emergency light lamp-operating device being used during an emergency.

As already mentioned above, both the normal lamp-operating device and the emergency light lamp-operating device, which must likewise be capable of being addressed in the system, have their own logical address by way of which they can communicate with the central control unit. Since both units, however, activate the same lamp, certain problems arise during the start-up and subsequent operation of the lighting system.

Thus, for example, in the case of the method for the start-up of EP 0 433 527 A1 it is provided that the lamps for the purposes of allocation of a suitable operating address deliver a visual signal, with at the same time the associated lamp-operating device being in contact with the control unit. A user of the lighting system can then inform the control unit in which space the lamp-operating device in question is located so that an operating address that takes the arrangement into consideration can be assigned thereto by the control unit. This method has proved good in many cases for the start-up of a lighting system, yet in the first place it is not possible for the present case of a combined normal safety light, since the visual display by means of the lamp cannot easily be allocated to one of the two operating devices. A further difficulty of the interconnection of two lamp-operating devices lies in the fact that whilst the higher-order control unit can detect the logical users, it is not able to allocate the two logical addresses to a single light or identify which two logical addresses occur together in one light.

The problems mentioned above could be circumvented if the central control station is informed which lamp-operating devices are interconnected to form a functional couple. Whilst this could by all means be effected manually by a user of the lighting system, as a rule this procedure is not practicable, since the lights of the system can be arranged so that they are very widely distributed.

The underlying object of the present invention accordingly is to specify a possibility, in the case of a control system of the kind mentioned above, of supplying to the control station information that gives details about which lamp-operating devices are interconnected in each case to form a functional couple.

The object is achieved by means of the invention that is defined in the independent claims.

A first aspect of the present invention relates in this connection to a control system for a plurality of lamp-operating devices arranged in a distributed manner that has at least one control station and also a control line that connects the control station to the lamp-operating devices, with each lamp-operating device having a receiver by way of which it can communicate with the control station and with each lamp-operating device belonging, furthermore, to a first or a second type and with it being possible to join together lamp-operating devices of the first and the second type to form functional couples. In accordance with the invention, in this connection the lamp-operating devices of the first type are configured and connected to the lamp-operating device of the second type, respectively allocated to them, in such a way that they can selectively activate or deactivate the lamp-operating device of the second type in accordance with a request of the control station.

The core idea of the present invention is thus to configure the two lamp-operating devices that are joined together to form a functional couple in such a way that one of the two can switch on and off the other lamp-operating device. Since a lamp-operating device that has been switched off is not able to communicate with the central control station, various possibilities emerge, as a result, for identifying the lamp-operating device which has been switched off in a method that proceeds automatically. After the identification has been effected, this lamp-operating device can then be unequivocally allocated to the first lamp-operating device.

The activation or deactivation of the lamp-operating device of the second type—which is preferably a normal lamp-operating device—is preferably effected by means of an interruption of the current supply for this lamp-operating device. To this end, the lamp-operating devices of the first type—in the preferred case that is the emergency light lamp-operating devices—have a controllable switch that interrupts the corresponding current supply and is opened or closed according to the demand of the central control station. For this, all the lamp-operating devices are preferably connected to common current-supply lines, with the phase for a lamp-operating device of the second type being guided through the associated lamp-operating device of the first type.

As a result of the possibility of selectively activating or deactivating the lamp-operating devices of the second type, as already mentioned possibilities emerge of allocating two operating devices, which are connected together, to one common functional couple. A first variant of a method in accordance with the invention then has the following steps:

a) the control station communicates with all the lamp-operating devices in order to ascertain from each an already existing address and/or to allocate to each a new address and, furthermore, in order to ascertain from all of the lamp-operating devices the respective type;

b) the control station calls up a certain lamp-operating device of the first type under its address established in accordance with step a) and gives it the command to deactivate an associated lamp-operating device of the second type—if such a device is present;

c) the control station successively calls up the lamp-operating devices of the second type under their addresses established in accordance with step a) and gives them the command to deliver a response signal;

d) the control station establishes whether a lamp-operating device of the second type has delivered no response signal and—if so—which one and registers that a lamp-operating device of the second type identified in this way forms a functional couple with the lamp-operating device of the first type, which was called up in accordance with step b);

e) the steps b) to d) are repeated calling up every other lamp-operating device of the first type until all the lamp-operating devices of the first type have been called up.

The method in accordance with the invention turns to its advantage the fact that the lamp-operating device of the second type deactivated by the lamp-operating device of the first type can no longer communicate with the central control station. By means of a check to see which of the originally determined devices cannot now be reached, it is then possible in a simple way to establish which lamp-operating device of the second type is connected to the lamp-operating device of the first type previously addressed.

Of course, the possibility also exists that lamp-operating devices of the first type will occur singly, that is, are not joined together with a device of the second type to form a functional couple. In this case, the central control station establishes that despite the request in step b) to the lamp-operating device of the first type to deactivate the associated device of the second type, all the lamp-operating devices of the second type can be addressed, this being interpreted by it to mean that the corresponding lamp-operating device of the first type is not part of a functional couple. The method in accordance with the invention thus also makes it possible to identify that a device of the first type is arranged singly.

The fundamental idea of the method in accordance with the invention of deactivating a lamp-operating device of the second type temporarily in order to establish which devices are joined together to form a functional couple can also be used in the case of a second variant of the method in accordance with the invention. In this connection, the first two steps correspond to steps a) and b) of the first variant described above. After deactivation of the lamp-operating device of the second type in step b), the control station now, however, in a step c) calls up all the lamp-operating devices of the second type and gives them the command to take up a specified operating state, to activate, for example, the associated lamps with a certain brightness.

In the step d) that follows, the control station then again calls up the lamp-operating device of the first type that was contacted in step b) and gives it the command to re-activate the associated lamp-operating device of the second type and to shift it into a switched-on operating state that differs from the operating state specified in step c).

In the step e) that follows, the control station determines the current operating states of all the lamp-operating devices of the second type and establishes whether one of these devices has an operating state that differs from the operating state specified in step c) and—if so—which one and registers that a lamp-operating device of the second type identified in this way forms a functional couple with the lamp-operating device of the first type that was called up in accordance with step b).

The steps b) to e) are repeated in turn as every other lamp-operating device of the first type is called up until all the lamp-operating devices of the first type have been called up.

Again the fact that the temporarily deactivated lamp-operating device of the second type cannot react to the generally transmitted command in step c) is exploited. In addition, in this variant it is provided that the lamp-operating devices of the second type generally take up a certain switched-on operating state when the current supply is re-established after a temporary interruption. Since in accordance with the present invention this differs from the general operating state specified in step c), in turn the lamp-operating device of the second type that is connected to the lamp-operating device of the first type contacted in step b) can be identified.

The operating states of the lamp-operating devices of the second type are preferably determined in step e) in that the control station successively calls up the lamp-operating devices under their addresses and gives them the command to signal their current operating state. The previously addressed switched-on operating state preferably exists when the associated lamp-operating device of the second type operates the lamp at 100% capacity. The operating state globally specified in step c) can, on the other hand, specify a lamp capacity that differs from this, for example 50%.

After a functional couple consisting of a lamp-operating device of the first type and a lamp-operating device of the second type has been determined, this couple preferably has a common address allocated to it, under which this functional couple can generally be contacted by the control station. Both devices can thus now be addressed under a common address so that the problems outlined at the beginning no longer exist and it is now possible to assign to the individual lamp-operating devices and also to the functional couples that have been determined those operating addresses that have already been addressed and which take into consideration the arrangement of the lights within the building that is to be illuminated.

The present invention thus offers a neat possibility of identifying functional couples and uniformly activating the associated lamp-operating devices. The advantages and possibilities of a central control of lights that are arranged in a distributed manner can thus be utilized fully in the usual way.

The invention shall be explained in greater detail in the following with the aid of the attached drawing, in which.

Figure 1:
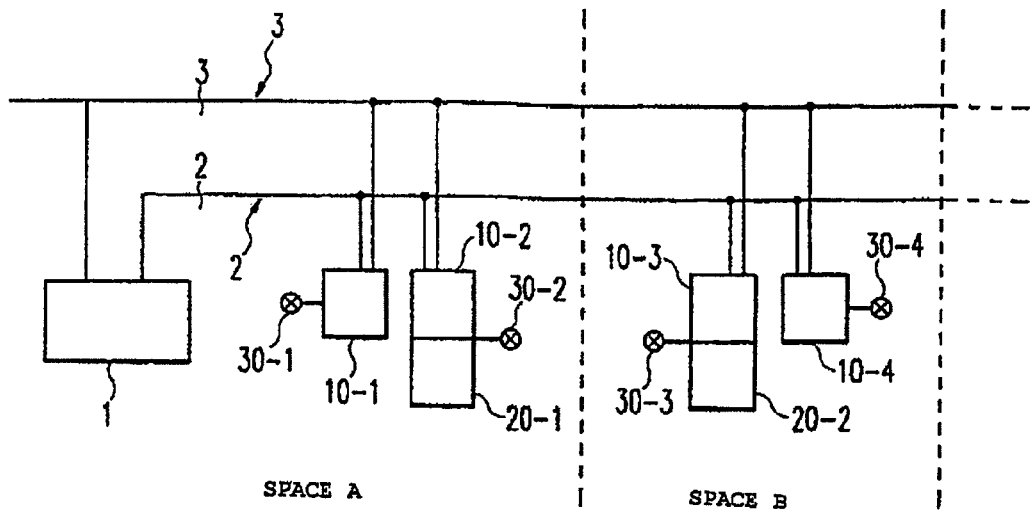
FIG. 1 shows a control system with a control station and also a plurality of non-centrally arranged light sources.

FIG. 1 shows a block circuit diagram of a control system in accordance with the invention with a supply line 3 and a control line 2. A control station 1 is connected both to the supply line 3 and to the control line 2. The system is provided for the illumination of a building, with a plurality of lamp-operating devices 10-1 to 10-4 and 20-1 and 20-2, which are also in each case connected to the supply line 3 and the control line 2, being arranged in various spaces. The lamp-operating devices are provided in this connection to activate and operate a plurality of lamps 30-1 to 30-4 (preferably fluorescent lamps) that are connected to the respective lamp-operating devices.

Figure 5:
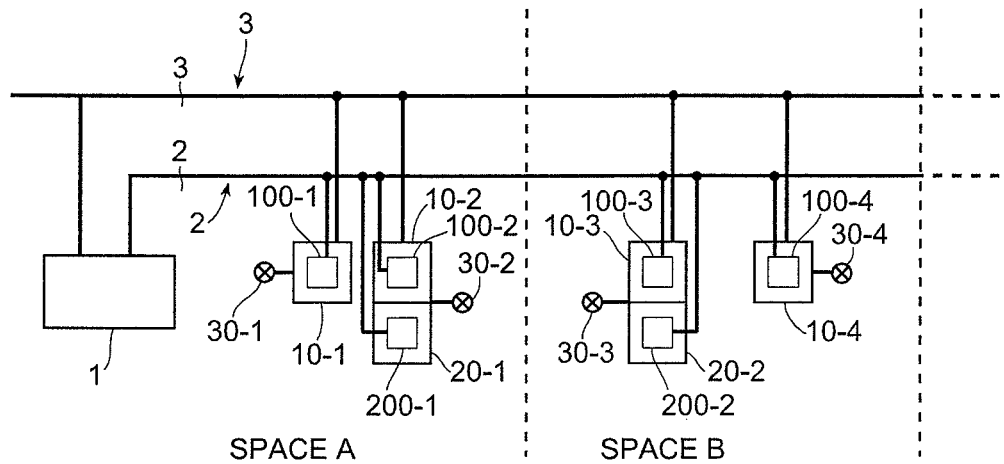
Figure 6:
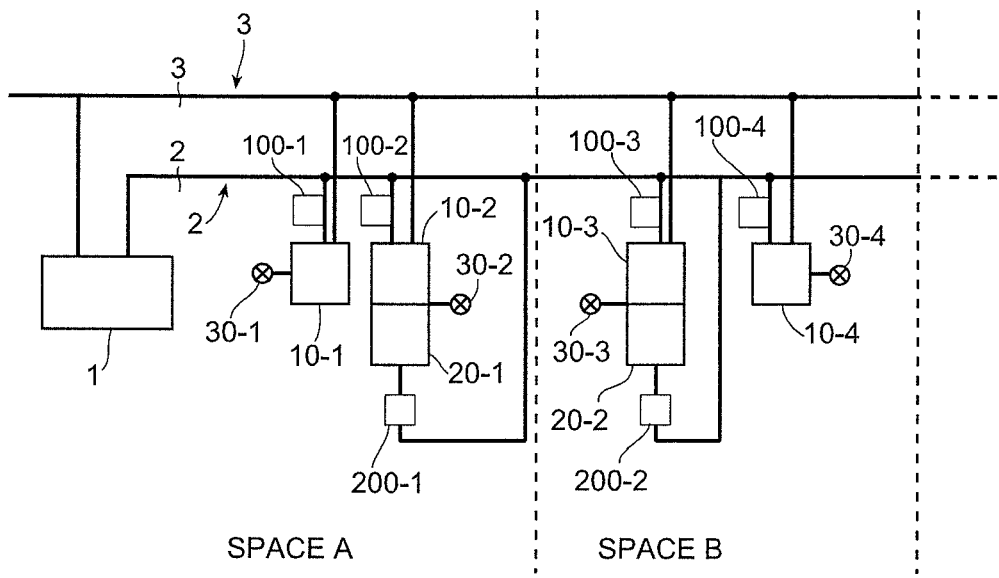

The lamp-operating devices can be divided into two different categories with regard to the tasks that they are to perform. The lamp-operating devices of the first type 20-1 and 20-2 are so-called emergency light lamp-operating devices. These are exclusively provided to guarantee certain basic lighting within the building in the case of an emergency. During normal operation of the lighting system, however, merely the lamp-operating devices of the second category 10-1 to 10-4 are used, these being normal lamp-operating devices that are able, for example, to operate the lamps 30-1 to 30-4 at different brightness values, with these values being specified by the control unit 1 by means of control commands. Each of the normal lamp-operating devices 10-1 to 10-4 has for this purpose a respective receiver 100-1 to 100-4, as shown in FIG. 5. Each receiver 100-1 to 100-4 is connected to the data line 2 and is able to exchange information with the control station 1 by way of the data line 2. The receivers 100-1 to 100-4 may be physically separated from each of the respective lamp operating devices 10-1 to 10-4 as shown in FIG. 6.

The emergency light lamp-operating devices 20-1 and 20-2 are also connected to the data line 2 and likewise each has a respective receiver 200-1 and 200-2, as shown in FIG. 5, since they too are able to receive commands from the control station 1 and execute them accordingly. The receivers 200-1 and 200-2 may be physically separated from each of the respective lamp operating devices 20-1 and 20-2, as shown in FIG. 6.

If a lamp is to be used both for normal operation and for emergency operation, it is to be connected both to a normal lamp-operating device and to an emergency light lamp-operating device. The two lamp-operating devices in this case form a functional couple jointly responsible for the operation and the activation of the lamp. In the case of the example shown in FIG. 1, the normal lamp-operating device 10-2, for example, forms a first functional couple with the emergency light lamp-operating device 20-1; a further functional couple is formed by the lamp-operating devices that are denoted by the reference numerals 10-3 and 20-2. In addition, however, there is of course also the possibility that a lamp is exclusively activated by a normal lamp-operating device or an emergency light lamp-operating device. The lamp is then in each case either provided just for normal operation or just for an emergency operation.

In order to be able to address the various lamp-operating devices individually, these each have an address by way of which they can be contacted by the control station 1. The normal and emergency light lamp-operating devices that are joined together to form a functional couple also in the first place have respective individual addresses. As was mentioned at the beginning, problems arise, however, in this connection when activating the associated lamps so that a way has to be found of bringing both devices together and activating them uniformly. The solution in accordance with the invention for this is also based on a special connection of the two devices which shall now be explained with the aid of FIG. 2.

Figure 2:
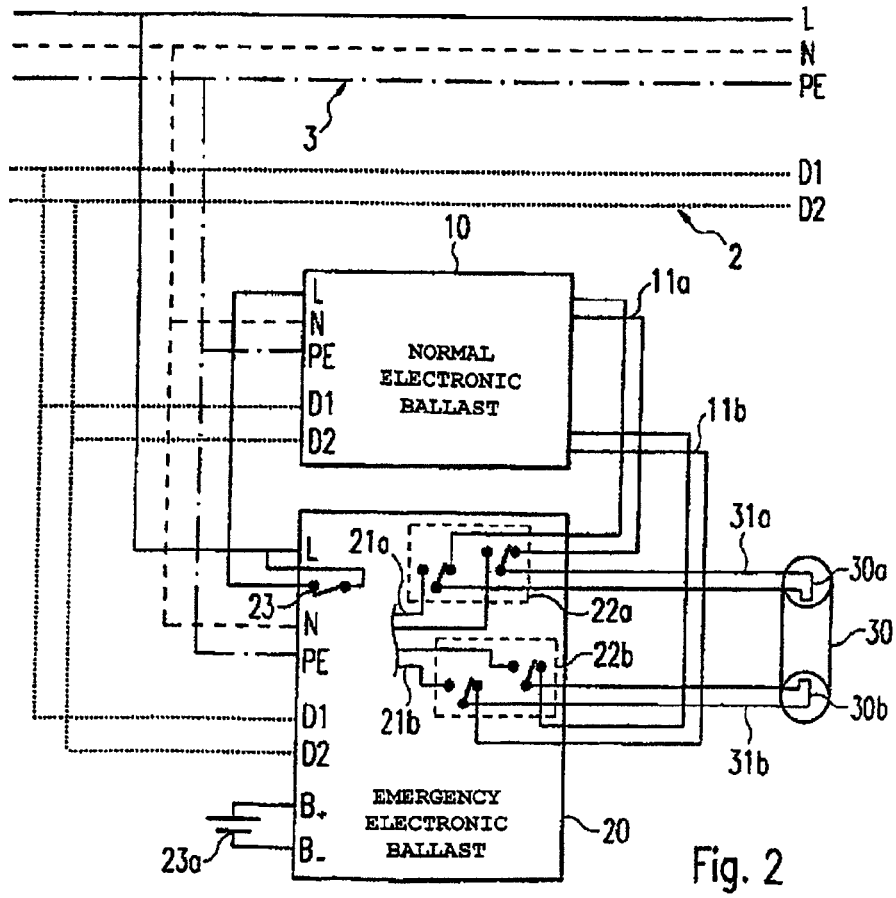
FIG. 2 shows a detailed block diagram of a functional couple that is formed from a standard lamp-operating device and an emergency light lamp-operating device.

FIG. 2 shows a functional couple which consists of a normal lamp-operating device 10 and an emergency light lamp-operating device 20. Both devices 10 and 20 have, as already mentioned, a receiver (not shown) for communication with the central control station and accordingly are connected to the two lines D1 and D2 of the data line 2. At the same time, both lamp-operating devices 10 and 20 are also connected to the current supply line 3, in which case a special feature consists in the fact that the phase line L for the normal lamp-operating device 10 is guided through the emergency light lamp-operating device 20 and is there interrupted by a controllable switch 23.

On account of this special connection the possibility exists for the emergency light lamp-operating device 20 to interrupt the current supply for the normal lamp-operating device 10 and to deactivate this completely.

This is a precondition for being able, in the method that is described later, to identify the normal lamp-operating device 10 unequivocally and to allocate it to the emergency light lamp-operating device 20.

The two lamp-operating devices 10 and 20 have—as usual electronic ballast—control units, smoothing circuit arrangements and inverters, as they are used in the case of conventional electronic ballast. Their precise structure is not therefore explained further in the following. Both devices have, furthermore, supply lines 11a and 11b, and 21a and 21b respectively, which can be connected to the heating circuits 31a and 31b for the lamp filaments 30a and 30b of the gas discharge lamp 30. The supply lines 11a and 11b of the normal lamp-operating device 10 are then in turn guided through the emergency light lamp-operating device 20. Since the lamp 30 is to be activated at a certain point in time either by the normal lamp-operating device 10 or by the emergency light lamp-operating device 20, the emergency light lamp-operating device 20 internally has two circuit units 22a and 22b which each have two switches and with which the two heating circuits 31a and 31b can be selectively connected to the supply lines 11a and 11b of the normal lamp-operating device 10 or the lines 21a and 21b of the emergency light lamp-operating device 20. The control of the two switching units 22a and 22b is then taken over by the emergency light lamp-operating device 20, since this is able to identify an emergency independently and automatically switch over to emergency operation. For this purpose, the emergency light lamp-operating device 20 has a monitoring circuit arrangement (not shown) that monitors the state of the current supply and in the event that a failure of the general network supply is identified, automatically initiates an emergency operation.

A further important feature of the emergency light lamp-operating device 20 is, moreover, a battery 23a which is charged during normal operation by way of the general current supply 3 and whose energy is used to operate the lamp 30 in the emergency operation.

Figure 3:
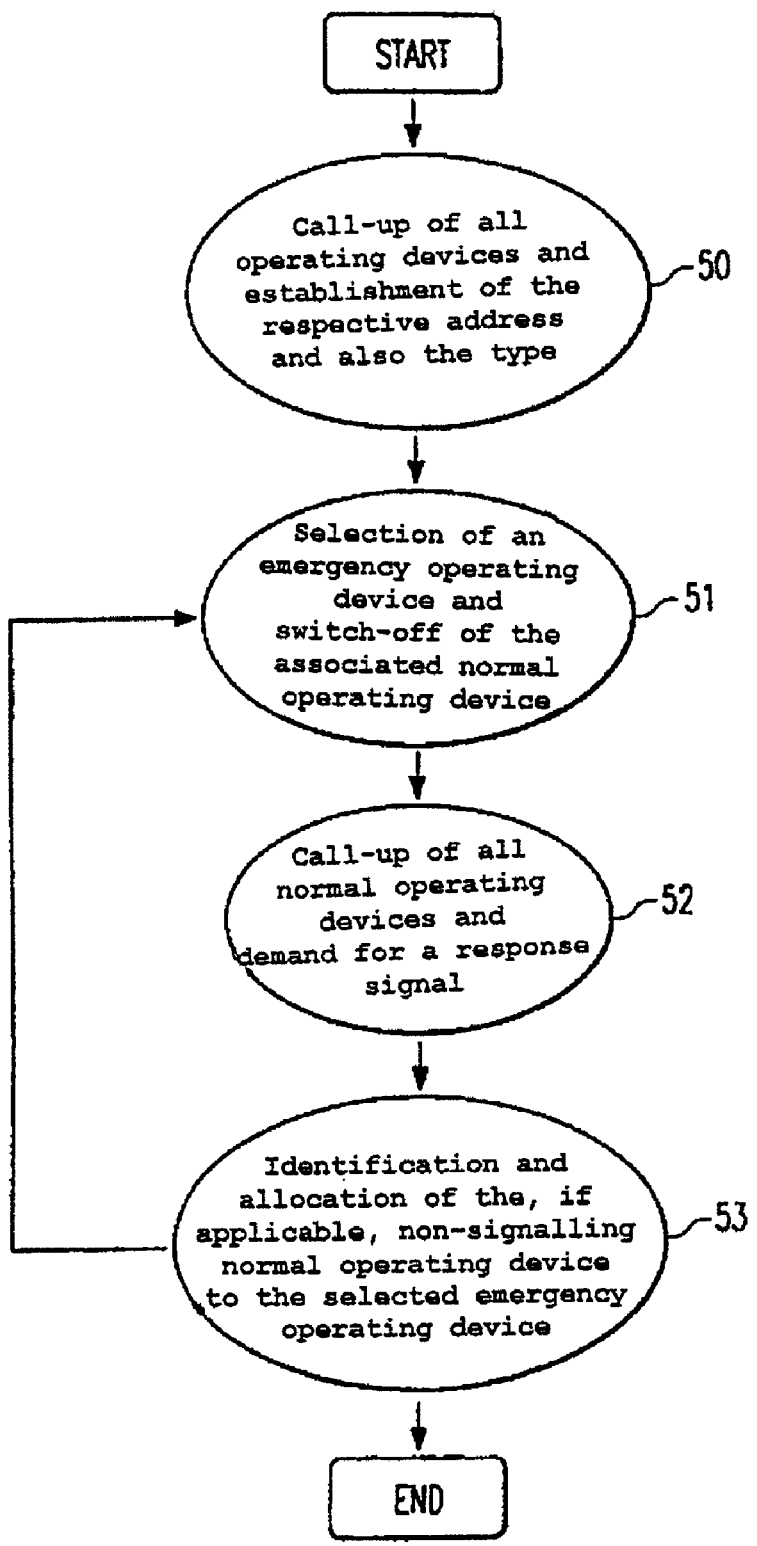
FIG. 3 shows a flow chart of a first variant in accordance with the invention for the identification of functional couples.

The functional couple shown in FIG. 2 is to be capable of being activated uniformly by the control station 1 during the subsequent operation of the lighting system. For this purpose, it is necessary to establish which normal lamp-operating devices form functional couples with which emergency light lamp-operating devices. A first variant of a method in accordance with the invention for this is explained in the following with the aid of the flow chart in FIG. 3.

In this connection, the central control station in a first step 50 contacts all the lamp-operating devices in order to ascertain an already existing address from each and/or to allocate a new address to each. In addition, in this step the control station also determines the type of the various lamp-operating devices.

This contacting of all the lamp-operating devices could be effected, for example, by the control station 1 first giving to the data line a global command with which it requests all lamp-operating devices to transmit a corresponding identification signal. The lamp-operating devices will thereupon send back, for example, a source address, allocated to them during manufacture, which is received by the control station 1. Usually, any one source address will reach the control station 1 first. Thereupon, the control station 1 requests the corresponding lamp-operating device to switch itself temporarily out of the process and continues the method until all the lamp-operating devices are able to transmit their source address. The type of the respective signalling lamp-operating device can then be coded, for example, by the source address or communicated by the signalling lamp-operating device in another way.

The possibility also exists, moreover, that the various lamp-operating devices do not in the first place have an individual address, but merely communicate their type. The control station 1 can then assign to the lamp-operating device that is just signalling an individual address by way of which it can be addressed for the rest of the course of the initialization. Furthermore, the possibility also exists for the lamp-operating devices to generate a respective random address by themselves at the beginning of the method, by way of which they can be addressed. The mechanism for generating the random address is then configured in such a way that the likelihood that two devices will generate the same address is extremely small.

In all cases, at the end of step 50 the information regarding which lamp-operating devices are connected to the system, by way of which address they can be contacted and whether it is a question of a normal lamp-operating device or an emergency light lamp-operating device is available in the control station 1.

In the step 51 that follows, the control station then calls up a certain emergency light lamp-operating device under its address which was established in the previous step 50 and gives it the command to open the switch 23 and thus interrupt the current supply for a normal lamp-operating device that is possibly connected to the selected emergency light lamp-operating device.

If the selected emergency light lamp-operating device is actually connected to a normal lamp-operating device, the latter is temporarily deactivated thereby.

In the subsequent step 52, the control station 1 successively calls up all the normal lamp-operating devices under their addresses that were established in the starting step 50 and gives them the command to deliver a response signal. This response signal preferably consists in the normal lamp-operating devices sending corresponding confirmation to the data lines 2 that they have received the call-up from the control station 1. If in the previous step 51 a normal lamp-operating device was deactivated by the selected emergency light lamp-operating device, then it is of course not able to react to the request of the control station 1.

In the step 53 that follows, the control station therefore establishes whether a normal lamp-operating device has delivered no response signal. If this is the case, the lamp-operating device in question is inevitably the normal lamp-operating device which is connected to the emergency light lamp-operating device contacted in step 51. The control station thus registers that the normal lamp-operating device identified in this way forms a functional couple with the emergency light lamp-operating device contacted in step a).

The normal lamp-operating device that is identified and allocated to the selected emergency light lamp-operating device is thereupon re-activated and steps 51 to 53 are then repeated, calling up in each case a new emergency light lamp-operating device, for so long until all the emergency light lamp-operating devices have been called up and it has been established whether these are connected to a normal lamp-operating device—and if so to which—or not. In this way, it is thus possible to determine all the functional couples to which a common operating address, under which both devices are activated uniformly, can then be assigned by the control station 1, for example.

The method in accordance with the invention thus presents the possibility of identifying in a neat way which devices are coupled together to form a functional couple. It is to be noted in addition that instead of a digital acknowledgement by way of the data lines in step 52 a response signal of the normal lamp-operating devices could also be delivered visually, for example by modulating the brightness of the lamp that is connected. In this case, a manual acknowledgement would be required through a user who would have to confirm that at least one lamp-operating device has reacted to the corresponding request signal of the control station. The variant previously described with the digital acknowledgement by way of the data lines is preferable in comparison, however, since the method can run completely independently without the intervention of a user.

It is possible to infer from the description of the method in accordance with the invention that the central idea of the present invention is that the emergency light lamp-operating device is able to switch on and off selectively a normal lamp-operating device that is connected to it. Since the normal lamp-operating device in the deactivated state is not able to communicate with the control station, it can be clearly identified since the information regarding which normal lamp-operating devices should respond is available to the control station on account of the "inquiry" carried out in step 50.

Moreover, it can also be provided that with the successive contacting of the normal lamp-operating devices in step 52 those lamp-operating devices are excluded that have already previously been allocated to an emergency light lamp-operating device. As a result, the method can be accelerated as a whole, since in a later stage only a few normal lamp-operating devices need to be interrogated. In this case, it is also no longer necessary to re-activate the normal lamp-operating device that is allocated to an emergency light lamp-operating device, since it no longer needs to take part in subsequent inquiries in step 52 anyway.

Figure 4:
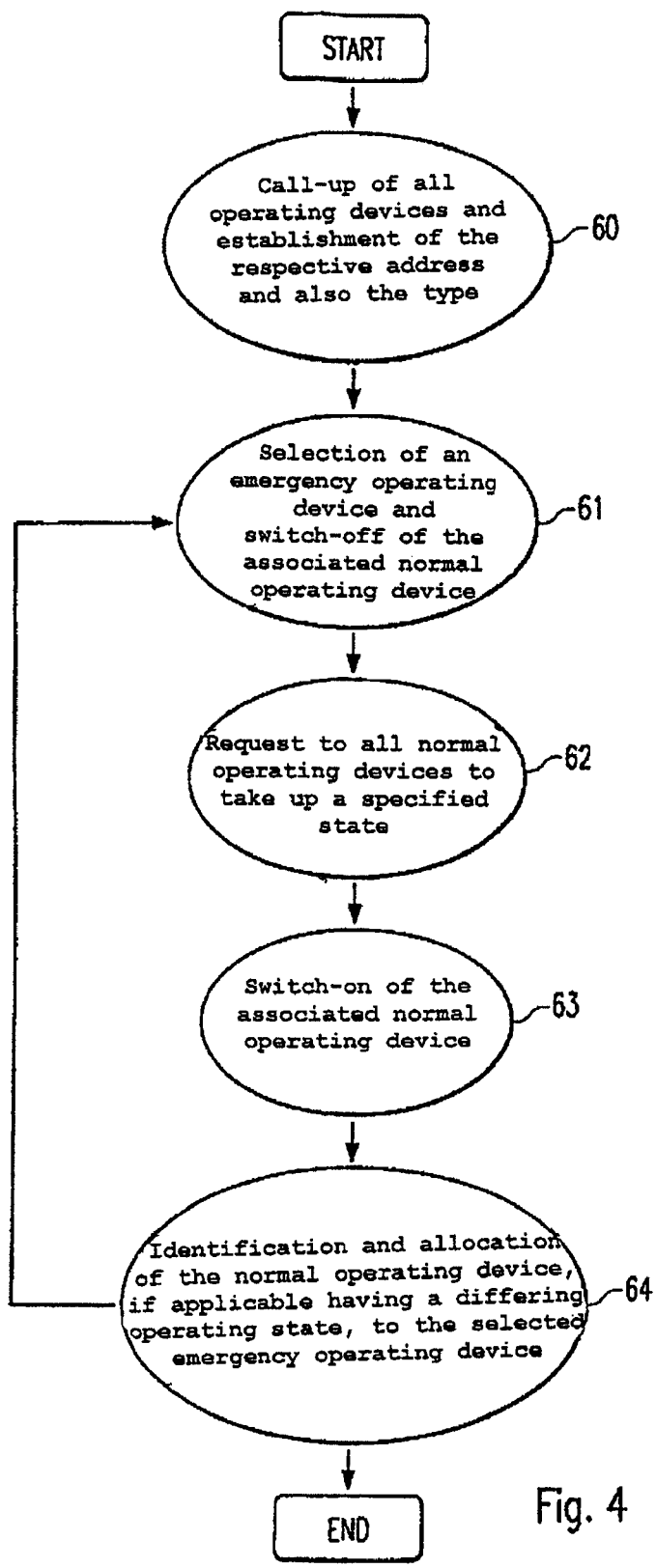
FIG. 4 shows a flow chart of a second variant of the method in accordance with the invention.

A second variant of the method in accordance with the invention that is identical in the first two steps 60 and 61 with the method steps 50 and 51 of the first method shall now also be discussed with the aid of FIG. 4.

After deactivation of the normal lamp-operating device in step 61 the control station now in the subsequent step 62, however, no longer successively contacts the normal lamp-operating devices individually, but instead transmits a global command to all the normal lamp-operating devices by which these are caused to take up a specified operating state. This specified operating state can, for example, consist in operating the respectively connected lamps at 50% of maximum brightness.

After this command has been transmitted, the control station in the subsequent step 63 again contacts the emergency light lamp-operating device already contacted in step 61 and requests the latter to connect the previously switched-off associated normal lamp-operating device back to the current supply. What is important about this step is that the normal lamp-operating device is formed in such a way that it automatically takes up a certain switched-on operating state after the current supply has been re-established, with this switched-on operating state differing in particular from the operating state specified in step 62.

In the subsequent step 64, thereupon the control station determines all the current operating states of the normal lamp-operating devices and establishes whether one of these devices has an operating state that differs from the operating state specified in step 62 and—if so—which one. This can be effected, for example, in that the control station successively contacts all the normal lamp-operating devices and gives them the command to signal their current operating state by way of the data line 2.

Once the control station has identified a normal lamp-operating device with a differing operating state, this is inevitably the normal lamp-operating device that is associated with the emergency light lamp-operating device contacted in step 61. The control station thus in turn registers that the selected emergency light lamp-operating device and the normal lamp-operating device identified in this way form a functional couple.

In turn, steps 61 to 64 are repeated, whilst calling up in each case a new emergency light lamp-operating device, for so long until all the emergency light lamp-operating devices have been worked through. In this connection, in the case of this variant normal lamp-operating devices already allocated to an emergency light lamp-operating device can also be excluded from the inquiry carried out in step 64 in order to accelerate the method as a whole.

At the end of this initializing process, the control device is able to contact each light source by way of one—and in particular just by way of one—address. The control device can thus now activate the light sources in the usual way. As a further measure to start up the system, however, it could also be provided that there is assigned to the light sources or to the associated lamp-operating devices or functional couples operating addresses that take into consideration the arrangement of the light sources within the building or region to be illuminated. The allocation of the operating addresses can then be effected, for example, in accordance with the method described in EP 0 433 527 A1.

All in all the present invention thus offers the possibility of identifying the functional couples within the control system in a few steps and a short time so that subsequently activation of the devices and functional couples can be effected in the usual way. The advantages and possibilities of a central control of light sources that are arranged in a distributed manner can thus be utilized fully.

The invention claimed is:

1. A control system for a plurality of lamp-operating devices that are arranged in a distributed manner comprising:
   at least one control station,
   a control line which connects the control station to each lamp-operating device,
   and also having a receiver that is allocated to each lamp-operating device and is provided for the purposes of communication with the control station, with each lamp-operating device belonging to a first or a second type and with it being possible to join together lamp-operating devices of the first and of the second type to form functional couples, wherein the lamp-operating devices of the first type are configured and connected to the lamp-operating device of the second type, respectively allocated to them, in such a way that they can selectively activate or deactivate the lamp-operating device of the second type in accordance with a request of the control station.

2. A control system according to claim 1, wherein the lamp-operating device of the first type of a functional couple has a controllable switch that interrupts the current supply for the associated lamp-operating device of the second type.

3. A control system according to claim 2, wherein all the lamp-operating devices are connected to common current supply lines, with the phase for a lamp-operating device of the second type being guided through the associated lamp-operating device of the first type.

4. A control system according to claim 2 wherein the lamp-operating devices of the second type are configured in such a way that after an interruption and subsequent re-establishment of the current supply a specified switched-on operating state is automatically taken up.

5. A control system according to claim 4, wherein the lamp-operating devices of the second type in the switched-on operating state operate an allocated light source at 100% of the maximum brightness.

6. A control system according to claim 1, wherein the lamp-operating devices of the first type and also the lamp-operating devices of the second type of a functional couple have respective supply lines which can be selectively connected to a light source that is to be operated by the lamp-operating devices.

7. A control system according to claim 6, wherein the light source that is to be operated is a gas discharge lamp, in particular a fluorescent lamp, with it being possible to connect the supply lines of the lamp-operating devices to the heating filaments of the gas discharge lamp.

8. A control system according to claim 6, wherein the supply lines of the lamp-operating device of the second type are guided through the associated lamp-operating device of the first type, with the lamp-operating device of the first type-having internal circuit units for the selective connection of the supply lines to the light source that is to be operated.

9. A control system according to claim 6, wherein the lamp-operating device of the first type is an emergency light lamp-operating device and the lamp-operating device of the second type is a normal lamp-operating device, with the emergency light lamp-operating device having a monitoring circuit arrangement which detects the state of the current supply and when an emergency is identified automatically initiates the activation of the light source by means of the emergency light lamp-operating device.

10. A control system according to claim 9, wherein the emergency light lamp-operating device has a battery or an accumulator, whose energy is used to activate the light source in the emergency.

11. A method for initializing a control system for a plurality of lamp-operating devices that are arranged in a distributed manner and each of which belongs to a first or a second type, with it being possible for lamp-operating devices of the first and the second type to be joined together to form functional couples that are connected in such a way that the lamp-operating device of the first type can activate and deactivate the associated lamp-operating device of the second type, in which case the initialization is to bring about a situation where a control station, which is connected to all the lamp-operating devices by way of a common control line, obtains information on which lamp-operating devices form a respective functional couple, and with the method comprising the following steps:
  a) the control station communicates with all the lamp-operating devices in order to ascertain from each an already existing address and/or to allocate to each a new address and, furthermore, in order to ascertain from all of the lamp-operating devices the respective type;
  b) the control station calls up a certain lamp-operating device of the first type under its address established in accordance with step a) and gives it the command to deactivate an associated lamp-operating device of the second type if such a device is present;
  c) the control station successively calls up the lamp-operating devices of the second type under their addresses established in accordance with step a) and gives them the command to deliver a response signal;
  d) the control station establishes whether a lamp-operating device of the second type has delivered no response signal and—if so—which one and registers that a lamp-operating device of the second type identified in this way forms a functional couple with the lamp-operating device of the first type, which was called up in accordance with step b); and
  e) the steps b) to d) are repeated calling up every other lamp-operating device of the first type until all the lamp-operating devices of the first type have been called up.

12. A method according to claim 11, wherein after the identification and allocation of a lamp-operating device of the second type to a lamp-operating device of the first type in step d) the corresponding lamp-operating device of the second type is re-activated.

13. A method according to claim 11, wherein lamp-operating devices of the second type that have already previously been allocated to a lamp-operating device of the first type are not contacted in step c) by the control station.

14. A method for initializing a control system for a plurality of lamp-operating devices that are arranged in a distributed manner and each of which belongs to a first or a second type, with it being possible for lamp-operating devices of the first and the second type to be joined together to form functional couples that are connected in such a way that the lamp-operating device of the first type can activate and deactivate the associated lamp-operating device of the second type, in which case the initialization is to bring about a situation where a control station, which is connected to all the lamp-operating devices by way of a common control line, obtains information on which lamp-operating devices form a respective functional couple, and with the method comprising the following steps:
  a) the control station communicates with all the lamp-operating devices in order to ascertain from each an already existing address and/or to allocate to each a new address and, furthermore, in order to ascertain from all of the lamp-operating devices the respective type;
  b) the control station calls up a certain lamp-operating device of the first type under its address established in accordance with step a) and gives it the command to deactivate an associated lamp-operating device of the second type if such a device is present;
  c) the control station calls up all the lamp-operating devices of the second type and gives them the command to take up a specified operating state;
  d) the control station calls up the lamp-operating device of the first type that was contacted in step a) and gives it the command to re-activate the associated lamp-operating device of the second type—if present—and to take up a switched-on operating state that differs from the operating state specified in step c);
  e) the control station determines the current operating states of all the lamp-operating devices of the second type, establishes whether a lamp-operating device of the second type has an operating state that differs from the operating state specified in step c) and—if so—which one and registers that a lamp-operating device of the second type identified in this way forms a functional couple with the lamp-operating device of the first type that was called up in accordance with step b); and
  f) the steps b) to e) are repeated calling up every other lamp-operating device of the first type until all the lamp-operating devices of the first type have been called up.

15. A method according to claim 14, wherein the control station no longer determines in step e) the current operating states of those lamp-operating devices of the second type that have already previously been allocated to a lamp-operating device of the first type.

16. A method according to claim 14, wherein in order to determine the operating states of the lamp-operating devices in step e) the control station successively calls up the lamp-operating devices of the second type under their addresses established in accordance with step a) and gives them the command to signal their current operating state.

17. A method according to claim 14, wherein a lamp-operating device of the second type in the switched-on operating state operates an associated lamp at 100% of the lamp capacity, with the operating state specified in step c) representing a lamp operation at a capacity that differs therefrom.

18. A method according to claim 11, wherein the lamp-operating devices of the second type are deactivated by an interruption of the current supply.

19. A method according to claim 11, wherein allocated to the determined functional couple consisting of a lamp-operating device of the first type and also a lamp-operating device of the second type there is a common operating address under which the functional pair can be contacted.

* * * * *